United States Patent [19]
Bour

[11] 4,111,904
[45] Sep. 5, 1978

[54] STABILIZATION OF POLYPYRROLIDONE

[75] Inventor: Edmond H. J. P. Bour, Limbricht, Netherlands

[73] Assignee: Stamicarbon, B.V., Geleen, Netherlands

[21] Appl. No.: 855,979

[22] Filed: Nov. 30, 1977

[30] Foreign Application Priority Data

Dec. 2, 1976 [NL] Netherlands .................. 7613408

[51] Int. Cl.² ........................................... C08K 5/21
[52] U.S. Cl. ........................................ 260/45.75 N
[58] Field of Search ............ 260/45.75 N, 78 P, 78 S

[56] References Cited

U.S. PATENT DOCUMENTS 2,705,227  3/1955  Stamatoff ................ 260/45.75 C

Primary Examiner—V. P. Hoke
Attorney, Agent, or Firm—Cushman, Darby & Cushman

[57] ABSTRACT

A process is described for stabilizing polypyrrolidone against thermal degradation which comprises blending into the polymer from 50 to 5000 ppm of the alkali metal salt of a nickel-biuret complex compound.

6 Claims, No Drawings

STABILIZATION OF POLYPYRROLIDONE

BACKGROUND OF THE INVENTION

The invention relates to a process for stabilizing polypyrrolidone against thermal degradation. Polypyrrolidone is subject to thermal degradation to a greater extent than other polyamides. For instance, spinning of polypyrrolidone into fibers is possible only when particularly pure and dry polymer is used as a starting material. Even then marked degradation can occur during the spinning operation, which gives rise to loss in weight and the formation of polymer with a lower molecular weight. See the discussion in e.g., Die Makromolekulare Chemie, 161 pp. 57-68 (1972).

DESCRIPTION OF THE INVENTION

Applicant has now found that this thermal degradation of polypyrrolidone polymers can be markedly reduced by adding a small amount of a particular stabilizer compound. Thus, according to the present invention, polypyrrolidone polymers are stabilized against thermal degradation, particularly during spinning operations, by incorporating in said polymer, as a stabilizer, a complex nickel compound having the following formula:

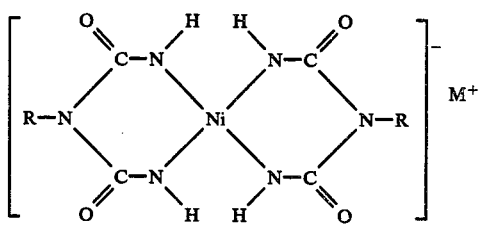

wherein R represents a hydrogen atom, or an alkyl or aryl radical; and M represents a monovalent metal cation.

In this way, thermal degradation of polypyrrolidone polymers, particularly during spinning thereof, is significantly diminished, especially in regard to reduction of the molecular weight; hence, it is no longer necessary to employ very high molecular weight polypyrrolidone polymers as a spinning starting material.

The complex nickel compounds used as stabilizers herein contain trivalent nickel. They can be prepared, in turn, from biuret or 3-substituted biuret, by the method described in "Inorganic Chemistry" 10, pp. 1202-1205 (1971), and in the thesis entitled: "Copper (III), Nickel (III) and Spin Triplet Cobalt (III) Complexes with Biuret and Related Ligands", by P.J.N.W.L. Birker (Nijmegen 1974). The said complex compound when based on unsubstituted biuret is stable and simple to prepare and is preferably used. However, the corresponding complexes based on 3-substituted biuret compounds, where R (in the above formula) denotes an alkyl group having from 1 to 6 carbon atoms or an aryl group having from 6 to 10 carbon atoms, may also be used, if so desired, in the form of a compound stabilized by addition of more ligands, such as 1-substituted biurets. The metal cation is usually an alkali metal ion, e.g., lithium, sodium, or caesium, but is preferably a potassium ion.

The said stabilizer may be added during the preparation of the polymer or it may be mixed into the prepared polymer in a known way before spinning. The amounts thereof used may vary from 50 to 5000 ppm by weight of the polypyrrolidone polymer. In most cases satisfactory effect is achieved by using an amount of between about 100 and about 500 ppm.

The polypyrrolidone polymer itself can be prepared by the anionic polymerization of pyrrolidone in mass or in a vehicle by means of potassium hydroxide or potassium lactamate as a catalyst and in the presence of carbon dioxide or sulphur dioxide as an accelerator, or one of the accelerators, as is already well-known in the art of the anionic polymerization of caprolactam. The molecular weights obtained can have widely varying values, corresponding to a relative viscosity of the polymer of between about 3 and about 30 or even higher. According to the invention the polypyrrolidone polymer can be easily spun at a relative viscosity of between about 3 and about 7 and yield filaments of acceptable proportions. The spinning operation itself may be effected by methods already well known, at a temperature of between about 250° and about 280°.

It is possible that in the practice of this invention, the nickel complex compound itself decomposes at the spinning temperatures. It is also quite possible that it is the products formed from such decomposition which have the actual stabilizing effect. Thus, the resulting spun polymer products e.g., filaments, may contain both the complex as such, and products from the decomposition of the complex.

The principles and advantages of the invention can be further seen and demonstrated by reference to the following illustrative Example and Comparative Example. The spinning operation therein was effected by means of very simple equipment substantially comprising a cylindrical supply vessel, one side of which is closed by a piston and the other side of which communicates with a spinning aperture of 0.3 mm in diameter. Means for heating the supply vessel and the spinning plate were provided. 15 grams of carefully dried, powdery polypyrrolidone were put in the vessel, after which the temperature of the equipment was raised to 270° C. and the pressure on the piston was increased to 10 atmospheres. The first molten product left the spinning aperture after about 20 minutes. The total amount of polymer could then be spun in about 7 minutes, insofar as the spinning did not have to be interrupted due to excessive degradation.

The polypyrrolidone employed had been prepared by the use of carbon dioxide and N-acetyl pyrrolidone as accelerators and potassium hydroxide as the catalyst.

EXAMPLE

Polypyrrolidone having a relative viscosity of 4.46 was used, which had had mixed therein, in the dry state, an amount of 200 ppm by weight, calculated to the polymer, of potassium nickel (III) bis-biuretate. The polymer was then spun as describved above. Spinning proceeded without difficulty for about 5 minutes while a filament of polypyrrolidone was formed having a relative viscosity of 2.37. The product spun in the following 2 minutes of spinning operation had a relative viscosity that fell from 2.35 to 2.03.

Comparative Example

Unstabilized pyrrolidone (as employed in the Example but with the nickel complex compound) having a relative viscosity of 4.46 was spun under the same conditions as described in the foregoing Example. This time, however, the filament product first obtained had a relative viscosity of only 2.03. The polymer degradation under these spinning conditions proceeded so quickly that no filament was any longer formed after operating for only about 1.5 minutes.

From these results it will be seen that with the nickel complex stabilizer compound employed according to the present invention, filament production from the polypyrrolidone material is greatly enhanced, and the relative viscosity of the polymer material in the filamentary product is significantly higher, than in the case where the same polypyrrolidone polymer is employed, but in the absense of the aforesaid stabilizer compound.

These results are exemplary of those obtained by using the same techniques but starting with polypyrrolidone polymer material having initial relative viscosities in the aforesaid range of between about 3 and about 30. Similar effects are also realized using the aforesaid complex compounds wherein, e.g., a 3-propyl biuret compound is employed, or a 3-ethylphenyl-substituted biuret compound is used.

The actual selection of the type and amount of stabilizer compound to be used may be readily determined by a few such simple experiments, or analogous experiments with the type of spinning operation actually to be commercially utilized, and employing the particular polypyrrolidone polymer from which it is desired to spin a filament.

It will, of course, be understood that the filament material produced may be made in a variety of sizes, may be used for forming staple fibers, and may also be used to form twisted yarns.

In the above description, where reference is made to relative viscosity, the same is determined using a solution of 1,0 g of polymer in 100 ml of 96% sulphuric acid.

What is claimed is:

1. A process for stabilizing polypyrrolidone polymer against thermal degradation which consists essentially blending with said polymer material an amount of between about 50 to about 5000 ppm by weight of a stabilizer compound of the formula

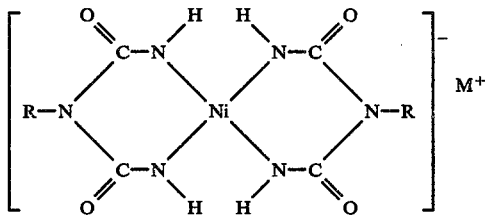

where R represents a hydrogen atom, or an alkyl radical of from 1 to 6 carbon atoms or an aryl radical of from 6 to 10 carbon atoms and wherein $M^+$ denotes a monovalent alkali metal cation.

2. The process of claim 1, wherein said stabilizer compound is used in an amount of between about 100 and about 500 ppm.

3. The process of claim 1, wherein R represents a hydrogen atom.

4. A thermally-stabilized polypyrrolidone polymer material having a relative viscosity of between about 3 and about 30 admixed with a stabilizing amount of between about 50 and 5000 ppm by weight of a stabilizer compound of the formula:

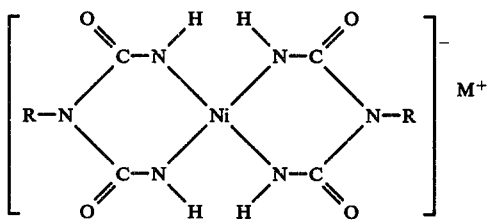

wherein R represents a hydrogen atom, or an alkyl radical of from 1 to 6 carbon atoms or an aryl radical of from 6 to 10 carbon atoms and wherein $M^+$ denotes a monovalent alkali metal cation.

5. The polypyrrolidone polymer of claim 4 wherein R represents a hydrogen atom and $M^+$ represents a potassium cation.

6. A fiber, filament or yarn substantially consisting of polypyrrolidone and containing a compound of the formula

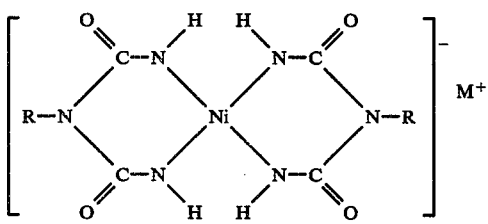

wherein R represents a hydrogen atom, or an alkyl radical of from 1 to 6 carbon atoms, or an aryl radical of from 6 to 10 carbon atoms and wherein $M^+$ denotes a monovalent alkali metal cation.

* * * * *